United States Patent
Ziaur Rahman

(10) Patent No.: US 9,928,211 B2
(45) Date of Patent: Mar. 27, 2018

(54) PARALLEL SELF-TIMED ADDER (PASTA)

(76) Inventor: Mohammed Ziaur Rahman, Kuala Lumpur (MY)

( * ) Notice: Subject to any disclaimer, the term of this patent is extended or adjusted under 35 U.S.C. 154(b) by 0 days.

(21) Appl. No.: 13/641,070

(22) PCT Filed: Apr. 13, 2011

(86) PCT No.: PCT/MY2011/000032
§ 371 (c)(1),
(2), (4) Date: Oct. 12, 2012

(87) PCT Pub. No.: WO2011/129683
PCT Pub. Date: Oct. 20, 2011

(65) Prior Publication Data
US 2013/0117345 A1    May 9, 2013

(30) Foreign Application Priority Data
Apr. 15, 2010 (MY) .............. PI2010001675

(51) Int. Cl.
*G06F 7/50* (2006.01)
*G06F 17/10* (2006.01)
*G06F 7/506* (2006.01)

(52) U.S. Cl.
CPC .............. *G06F 17/10* (2013.01); *G06F 7/506* (2013.01)

(58) Field of Classification Search
CPC ..................................... G06F 7/506
USPC ........................ 708/670, 700–714
See application file for complete search history.

(56) References Cited

U.S. PATENT DOCUMENTS

| | | | | |
|---|---|---|---|---|
| 3,056,552 A * | 10/1962 | Wagner | .................... | 708/706 |
| 3,987,291 A * | 10/1976 | Gooding | ................ | G06F 7/508 |
| | | | | 708/711 |
| 5,636,351 A * | 6/1997 | Lee | .................... | G06F 7/483 |
| | | | | 708/209 |
| 6,484,193 B1 * | 11/2002 | Choe et al. | ................ | 708/625 |

OTHER PUBLICATIONS

Nityanand Dubey, Universal Logic: MUX to Logic Gates Conversion, Jan. 7, 2010, Nityanand's Weblog, pp. 1-11.*
See ISR—nothing considered relevant to patentability.

* cited by examiner

*Primary Examiner* — Tan V. Mai
(74) *Attorney, Agent, or Firm* — Michael Pettit

(57) ABSTRACT

A parallel self-timed adder (PASTA) is disclosed. It is based on recursive formulation and uses only half adders for performing multi-bit binary addition. Theoretically the operation is parallel for those bits that do not need any carry chain propagation. Thus the new approach attains logarithmic performance without any special speed-up circuitry or look-ahead schema. The corresponding CMOS implementation of the design along with completion detection unit is also presented. The design is regular and does not have any practical limitations of fan-ins or fan-outs or complex interconnections. Thus it is more suitable for adoption in fast adder implementation in high-performance processors. The performance of the implementation is tested using SPICE circuit simulation tool by linear technology. Simulation results show its superiority over cascaded circuit adders. A constant time carry propagation is also achieved using the proposed implementation by tuning the CMOS parameters.

5 Claims, 2 Drawing Sheets a) A Single Bit Adder Module
b) A Single Bit Carry Module
c) 2x1 MUX for the 1 bit Adder
d) The termination signal generation circuit

PARALLEL SELF-TIMED ADDER (PASTA)

FIELD OF THE INVENTION

The present invention relates generally to electronic processors that perform arithmetic operations (add/subtract/division/multiplication). Specifically, it relates to adder circuits for use in semiconductor integrated circuits and other electronic devices.

BACKGROUND OF THE INVENTION

Binary addition is the single most important operation that a computer processor performs and has been thoroughly investigated since the beginning of computing. The performance of processors is significantly influenced by the speed of their adders and it is shown by M. A. Franklin and T. Pan, Performance Comparison of Asynchronous Adders, in Proc. Of Int'l Symp. Advanced Research in Asynchronous Circuits and Systems, pp. 117-125, November 1994; that in a prototypical RISC machine (DLX), 72 percent of the instructions perform additions (or subtractions) in the datapath (J. L. Hennessy and D. A. Patterson, Computer Architecture: A Quantitative Approach. Morgan Kaufmann, 1990). It is even reported by "J. D. Garside, A CMOS VLSI Implementation of an Asynchronous ALU, Asynchronous Design Methodologies, S. Furber and M. Edwards, eds., vol. A-28 of IFIP Trans., pp. 181-207 1993;" to reach 80 percent in ARM processors.

The adders can be sequential or combinatorial. As the sequential adders are bound to perform slowly due to the incremental nature of operation, sequential adders are not considered for parallel and fast adders. The basic building block of combinatorial digital adders is a single bit adder. The Half-Adders (HA) are the simplest single bit adders. The Full-Adders (FA) are single bit adders with the provision of carry input and output. The full-adders are typically composed of two HAs and hence are more expensive than half-adders in terms of area, time and inter-connection complexity.

The most common approach for designing multi-bit adders is to form a chain of FA blocks by connecting the carry out bit of a FA to the carry in bit of the next FA block. It is known as Ripple Carry Adder (RCA). The delay in RCAs increases linearly with number of bits. However, it remains the most efficient and thereby the choice for the designers for fewer number of bits ($\leq 4$) as clarified by N. H. E. Weste, K. Eshraghian, Principles of CMOS VLSI Design A Systems Prespective, 2nd Edition, Addison-Wesley Pub., 1994. Many different combinatorial adders are designed for improving the efficiency of basic RCAs and some of them consider the possible parallelism of the addition operation.

As described by R. E. Ladner and M. J. Fischer, Parallel Prefix Computation, Journal of the ACM, 27(4), pp. 831-838, October 1980; addition is a special prefix problem which means that each sum bit is dependent on all equal or lower input bits. This dependency makes it difficult to implement a parallel algorithm for addition. However the flow of bits can be tactfully arranged for a tree structured implementation of the adder that can reduce the addition overhead significantly. Carry Look Ahead/Carry Select/Carry Skip adders belong to this category of adders. On the other hand the Carry Save adders avoid the carry propagation altogether by employing a redundant number representation.

Eventually the redundant number needs to be converted to the non-redundant representation by using a carry propagate adder that eliminates much of earlier gains.

Apart from the theoretically possible best design for adders some implementation issues regarding circuit complexity and fabrication limitations also play a crucial role in circuit design. The circuit complexity and irregular design can render it infeasible for VLSI fabrication. Moreover, the number of outputs an input signal need to drive is limited which is known as fan-out limitation. The fan-out limitation also incurs extra delay as the capacitance increases with increasing fan-out parameter. The power dissipation is also another important practical issue that limits the number of interconnection in a VLSI fabrication.

As reported by Fu-C. Cheng, S. H. Unger and Michael Theobald, Self-Timed Carry-Lookahead Adders, IEEE Transactions On Computers, 49(7), pp. 659-672, July 2000; the best parallel adder can perform addition in log of log number of bits time. Typically the area and interconnection efficiency is traded off to achieve logarithmic/sub-logarithmic performance. Thus, it remains to be a challenge for the researchers to achieve fast adder with less area and interconnection requirement.

The present invention discloses a recursive formulation for PArallel Self-Timed Adder (PASTA). The design of PASTA is regular and uses HAs along with multiplexers with minimum interconnection requirement. Thus the interconnection and area requirement is linear that makes it practical to fabricate in a VLSI chip. The design works in truly parallel manner for the number of bits that do not require carry propagation. The carry chains for long number of bits are logarithmic and significantly smaller (B. Gilchrist, J. H. Pomerene, and S. Y. Wong, Fast Carry Logic for Digital Computers, IRE Trans. Electronic Computers, 4(4): 133-136, December 1955). Hence theoretically it can perform in logarithmic time. It is self-timed that means it will signal the completion of addition as soon as it is done thereby overcoming the clocking limitations.

SUMMARY OF THE INVENTION

Accordingly, it is an object of the present invention to provide a fast and area/interconnection efficient parallel adder.

Briefly, the embodiment of this invention is to provide a recursive formulation for Parallel Self-Timed Adder (PASTA). The design of PASTA is regular and uses Half Adders along with multiplexers with minimum interconnection requirement. Thus the interconnection and area requirement is linear making it easy to fabricate in a VLSI chip. The design works in truly parallel manner for the number of bits that do not require carry propagation. Thus theoretically it can perform in logarithmic time as the carry chains for long number of bits are logarithmic and significantly smaller as disclosed by B. Gilchrist, J. H. Pomerene, and S. Y. Wong, Fast Carry Logic for Digital Computers, IRE Trans. Electronic Computers, 4(4): 133-136, December 1955.

The single bit PASTA selects the original inputs at the beginning using Multiplexers and generates the result of single bit summation at the first step. For subsequent operations, the sum bit from a single bit adder block of PASTA is connected recursively to itself for addition with the carry in from the previous bit adder. Whenever a carry is generated or needs propagation from a bit position, it is transferred to higher bit level and hence its own carry is modified to zero. Thus the construction of a plurality of adders is pretty similar to RCA. The advantage is that it is self-timed and logarithmic. It will signal the completion of addition as soon as all the carry signals from individual bit adders are zero.

These objects and advantages of the present invention will become clear to those skilled in the art as illustrated in the detailed description and figures.

BRIEF DESCRIPTION OF THE DRAWING/FIGURES

Figure 3:
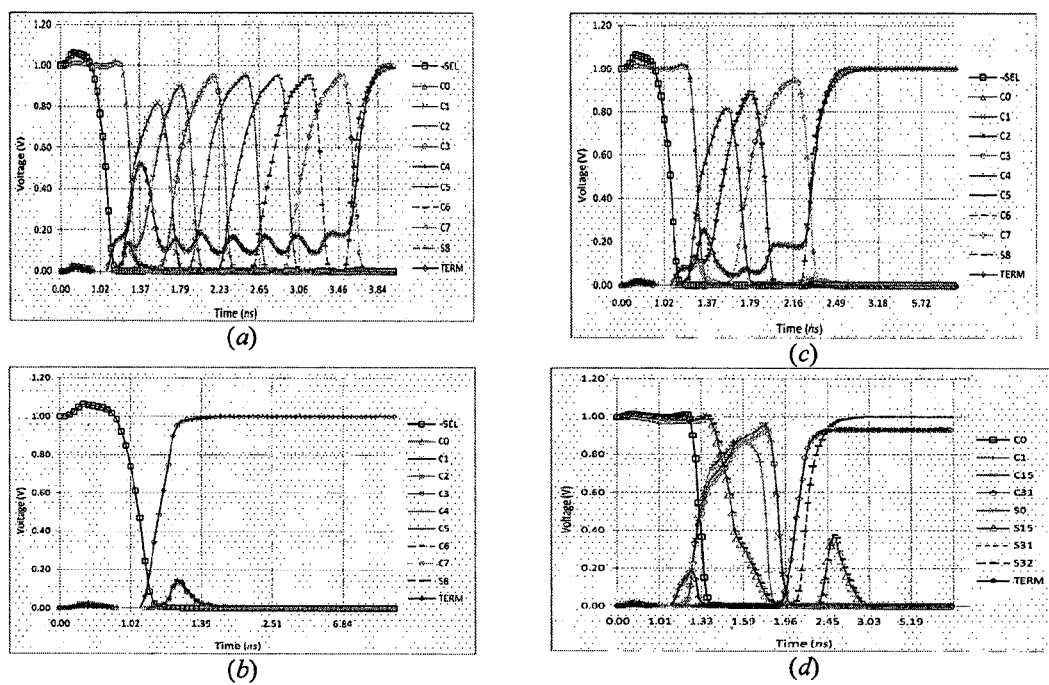

FIG. 3 is the simulated timing diagram from 8 bit PASTA implementation. (a) The worst-case carry propagation while adding operands $(FF)_{16}$ and $(1)_{16}$, (b) The best-case carry propagation while adding operands $(F7)_{16}$ and $(0)_{16}$, and (c) The average-case carry propagation while adding operands $(F7)_{16}$ and $(11)_{16}$. S8 is the carry out signal for the entire block. (d) Timing Diagram for addition of $(FFFF\ FFFF)_{16}$ and $(1)_2$ operands from 32 bit constant carry propagation PASTA implementation.

DETAILED DESCRIPTION OF THE PRESENT INVENTION

Figure 1:
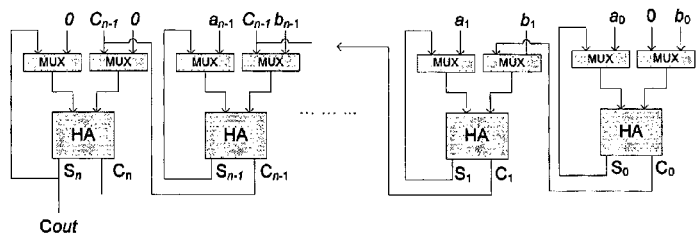
FIG. 1 is a block diagram of the recursive parallel self-timed adder.

A first embodiment of the parallel self-timed adder is presented in FIG. 1. Multi-bit adders are often constructed from single bit adders using combinatorial and sequential circuits for asynchronous or synchronous design. The sequential circuits are often serial/chain adders and are not the match for high speed combinatorial adders.

Let $a_{n-1}a_{n-2}\ldots a_0$ and $b_{n-1}b_{n-2}\ldots b_0$ be two n-bit binary numbers with sum and carry denoted by $S_{n-1}S_{n-2}\ldots S_0$ and $c_n c_{n-1}\ldots c_0$ where $0^{th}$ bit represents the least significant bit. Basic single bit adders are now discussed.

Single Bit Adders:

Single bit Half-Adders (HA) and Full-Adders (FA) are the fundamental building blocks for nearly all high-speed adders. A single bit HA for $i^{th}$ bit addition is logically formulated as follows:

$$S_i = a_i \oplus b_i$$

$$c_{i+1} = a_i b_i \qquad (1)$$

According to delay model by A. Tyagi. A reduced-area scheme for carry-select adders. *IEEE Trans. Comput.*, 42(10):1162-1170, October 1993; simple logic gates (AND, OR, NAND, NOR, NOT) have 1 unit of associated gate delay and XOR/XNOR have 2 units of gate delay. Thus, the gate level delays associated with $S_i$ and $c_i$ bits are 2 and 1 respectively. The gate level area complexity for HAs is hence 2+1=3.

A single bit full adder implementation additionally takes consideration of the carry-in input from the preceding single bit unit and formulated as follows:

$$S_i = a_i \oplus b_i \oplus c_i$$

$$c_{i+1} = a_i b_i + (a_i \oplus b_i) c_i \qquad (2)$$

The gate level delay associated with $S_i$, and $c_i$, bits are 4. The gate level area complexity for FAs is 7.

The recursive binary addition formula for addition of A and B is presented as follows.

Recursive Formula for Binary Addition:

Let $S_i^j$ and $C_i^j$ be the Sum and Carry respectively for $i^{th}$ bit at the $j^{th}$ recursion. The initial condition for the addition operation can now be defined as follows:

$$S_i^0 = a_i \oplus b_i$$

$$C_i^0 = a_i b_i \qquad (3)$$

The $j^{th}$ iteration for the recursive addition can be found as follows:

$$S_i^j = S_i^{j-1} \oplus C_{i-1}^{j-1} \qquad (4)$$

$$C_i^j = S_i^{j-1} C_{i-1}^{j-1} \qquad (5)$$

The recursion is terminated at the $k^{th}$ iteration when the following condition is met.

$$C_n^k C_{n-1}^k \wedge C_0^k = 0 \qquad (6)$$

Using the formulae presented in equations (3)-(6), a fast adder will now be designed. At first the correctness of the recursive formulation will be proved inductively by the following observation and subsequent theorem.

Observation 1: In a single bit adder with no carry in, the maximum obtainable result is 2.

Explanation. It is obvious that the sum cannot exceed the maximum sum obtained by two highest possible operands and hence should be equal or less than 2.

The significance of this observation is that for individual $i^{th}$ bit adder, the case of having $S_i=1$ and $C_i=1$ (decimal value of 3) is impossible as it will exceed the maximum of the sum of two inputs which is 2 (binary 10). Thus the only valid (S, C) forms by $i^{th}$ bit adder are (0, 0), (0, 1) and (1, 0).

Theorem 1: The recursive formulation of (3), (4), (5) and (6) will produce correct sum for any number of bits and will terminate at finite time.

Proof. We prove the correctness of the algorithm by induction on terminating condition.

Basis: For operands A, B such that $c_i^0 = 0$ for $\forall i$, $i \in [0\ldots n]$, the proposed recursive formulation produces correct results in parallel by single bit computation time and terminates instantly as condition (6) is met.

Induction: Assume $C_i^k \neq 0$ for $\exists i$. Let j be such a bit for which $C_j^k = 1$. First we show that it will be killed in the $(k+1)^{th}$ iteration and next we will show that it will be successfully transmitted to next higher bit in the $(k+1)^{th}$ iteration.

According to Observation 1, $(S_j^k, C_j^k)$, $(S_{j+1}^k, C_{j+1}^k)$ could be in any of (0, 0), (0, 1) or (1, 0) forms. As $C_j^k = 1$, it implies that $S_j^k = 0$. Hence, from equation (5), $C_j^{k+1} = 0$ for any input condition between 0 to j−1 bits.

We now consider the next higher bit $(S_{j+1}^k, C_{j+1}^k)$ at $k^{th}$ iteration. By observation 1, it could be in any of (0, 0), (0, 1) or (1, 0) forms. In the $(k+1)^{th}$ iteration, the (0, 0) and (0, 1) forms from $k^{th}$ iteration will correctly produce output of (1, 0) following equation (4) and (5) and hence carry will be absorbed in $(j+1)^{th}$ bit. For (1, 0) form, the carry is supposed to propagate through this bit level as the sum value is 1. By applying (4) and (5), we find $C_{j+1}^{K+1} = 1$. Thus the carry propagation/killing will be correctly performed by $j^{th}$ bit adder.

Finally, there is one extra bit adder block for carry out of the n-bit adder. This will have initial output $(S_n^0, C_n^0) = (0, 0)$. Any carry chain is hence bound to end up at this bit and produce output (1, 0), if it is not already killed by any previous bit levels during earlier iteration(s). Thus all the single bit adders will successfully kill or transfer the carries to the next level until being killed at the $n^{th}$ bit carry out block. This ensures that terminating condition is always reached by the recursive formulation. QED.

The mathematical form presented above is valid under the condition that the iterations take place simultaneously and the signals will be available synchronously from the previous level. This implicates a clocked design. However, the complexity is supposed to rise for a clocked circuit. In the next section we present a pseudo-sequential feedback circuit for the implementation of the proposed recursive formulation.

Architecture of PASTA

The general architecture of the proposed recursive adder is presented in FIG. 1.

The selection bits for 2 input multiplexers will be a single 0 to 1 pulse (denoted SEL in the CMOS implementation diagram). It will initially select the actual inputs during "SEL =0" and will switch on to feedback/carry paths for subsequent iterations (SEL=1). The feedback path from the HAs enable the recursion to continue until the terminating condition is met.

CMOS Implementation of PASTA

Figure 2:
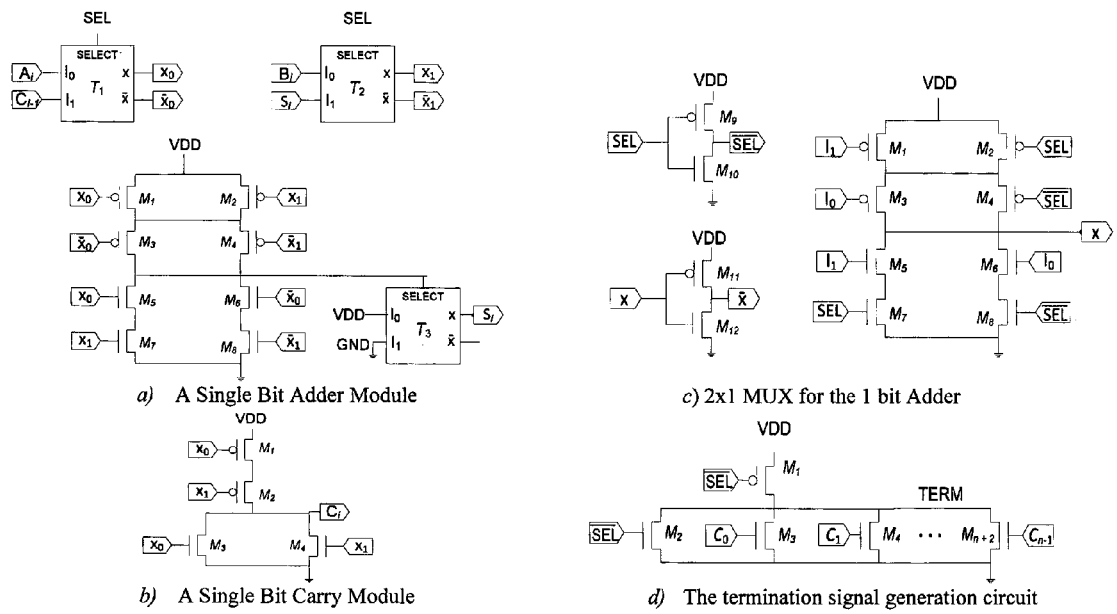
FIG. 2 is an implementation of the recursive parallel self-timed adders using CMOS transistors.

The CMOS implementation of the proposed embodiment is shown in FIG. 2.

One particular practical issue is synchronization of the carry transitions during the recursion. The recursion will be implemented by a single pulse of the carry signal. However, this implies there will be switching transients for the rising and falling edge of the carry signals from one block to the next. To avoid the pitfall of switching twice (or multiple times) for the same signal the sum and carry outputs are separated by an extra multiplexer that tunes the delays associated in the feedback path and helps avoid the switching transients due to feedback path of Sum bits.

The termination signal following equation (6) can be generated by the CMOS implementation as shown in FIG. 2(*d*). In addition to the "and" of $C_i$'s, the negative of SEL signal is used to ensure that the termination cannot be turned on accidentally during the initial selection phase of the actual inputs.

Though, the TERM signal is the only block where as many as n +2 interconnections are needed it will not create any fan-in problem as all the connections are parallel except a single pull-up transistor.

Performance Analysis

It is evident from the architecture and implementation of FIG. 1 and FIG. 2 that with the exception of multiplexers, PASTA is simpler than most simple ripple carry adders as it uses HAs while RCAs use FAs. Consequently, it is practical and will not suffer from any delays from complex circuitry and interconnection of wires. The architecture is also highly regular for implementation on VLSI chips. Regularity is a key design objective for VLSI designers and hence it is addressed by many earlier researchers for efficient adder implementation as clarified by R. P. Brent and H. T. Kung. A regular layout for parallel adders. IEEE Trans. Comput., 31(3):260-264, March 1982.

Logic and time complexity of available adders along with PASTA are shown in Table 1. Though the theoretical limit of PASTA is similar to existing logarithmic algorithms, it achieves the same performance supporting a regular structure with constant fan-in and fan-out. Thus, it is better for the VLSI implementation than the prefix algorithms. Moreover, it is shown by SPICE simulations in the next section that it is possible to achieve constant time carry propagation by PASTA implementation. This phenomenon can be utilized for a future constant time parallel adder.

TABLE 1

| Type | Gate Count | Transistor Count | Time Complexity | Area |
|---|---|---|---|---|
| RCA | 7n | 28n | O(n) | O(n) |
| CLA | 14n | 48n − 22 | O(lg n) | O(n) |
| BKA | 10n | — | O(lg n) | O(n lg n) |
| Delay Insensitive RCA | 30n | 42n | O(lg n) | O(n) |
| Delay Insensitive CLA with Speed up Circuit | 39.5n − 2 | 72.5n − 2 | O(lg lg n) | O(n) |
| PASTA | 9n | 34n | O(lg n) | O(n) |

SPICE Simulation Results

The specified CMOS circuit is simulated using Linear Technology SPICE version 4.04i. The 50 nm fourth generation Berkeley Short-channel IGFET Model (BSIM4) is used. Initially, the outcome of 8 bit adders are presented to show the practical realization of the prototype implementation. In practicality, the situation is complicated due to the length of the carry signal in effect for the next block. If the duration is not properly tuned or quite large this could feed carry to the next block for multiple transitions before eventually settling down to zero. This is similar to race condition as the final outcome is not predictable. Consequently, it is important to tune the MOS dimensions for proper synchronization.

In FIG. 3, the timing diagrams for different signals are shown for the 8 bit PASTA implementation. Only carries ($C_0$-$C_7$) and carry out of the entire block ($S_8$) are shown to maintain the clarity of the figure. Terminating signal (TERM) and ¬ (SELECT) signal for MUXes are also displayed. As evident from the figure, the adder can perform addition in spite of the fact that there are effectively two transition periods (rise time and fall time) of the carry-in signals from the previous stages. The timing can be tuned so that the sum signal starts changing after the full rise of the carry input. This is also the purpose of the introduction of Multiplexers producing the sum bit.

The worst-case, best-case and average case for maximum, minimum and average length carry propagation is highlighted in the timing diagrams of FIG. 3 (*a*), (*b*) and (*c*). The best-case addition avoids any unnecessary delay as it is generated without any propagation delay while the worst-case involves cascaded delays by each bit adders. The average case shows how the separate carry propagation is limited within their chain and thus proceeds in parallel. Especially noticeable is the fact that $C_2$ and $C_6$ are overlapping at near exact times as they are at the same distance from the start of the carry chain from bit 0 and bit 4 respectively.

As the proposed approach is a very basic one without any lookahead scheme and further optimization, we compare the performances of similar chained schemes of RCA and Delay Insensitive RCA (DIRCA). The results are displayed in Table 2. For the average case we have used the expected carry length for n bit binary numbers as found by G. W. Reitwiesner, The Determination of Carry Propagation Length for Binary Addition, IRE Trans. On Electronic Computers, vol. EC-9, pp. 35-38, March 1960. The delay in case of PASTA is computed from the switching time (when SEL changes to 1 from 0) of the multiplexers.

TABLE 2

|       | Worst Case Delay (ns) | Best Case Delay (ns) | Avg. Case Delay (ns) |
|-------|-----------------------|----------------------|----------------------|
| RCA   | 2.67                  | N/A                  | N/A                  |
| DIRCA | 1.81                  | 1.81                 | 1.81                 |
| PASTA | 2.75                  | 0.19                 | 1.25                 |

It is to be noted that DIRCA architecture is not able to perform better in the best/average cases. This is due to the fact that dual rail signals are reset at the beginning of the computation and require propagation from previous completed stages to produce successful completion signal. We have used the completion signal as provided by Fu-C. Cheng, Practical Design and Performance Evaluation of Completion Detection Circuit, In proceedings of the Intl. Conf. on Comp. Design (ICCD), pp. 354-359, October 1998.

The results clearly indicate the potential of the new PASTA as it performs best among the cascaded logic designs. It is due to the truly parallel theoretical basis of the design for independent carry chains.

However, the biggest advantage that could be reaped out of the proposed design could possibly be a truly constant time parallel adder. It is found that the cascading delay for successive carry propagation can be totally avoided by tuning the MOS dimensions. The timing diagram for single carry propagation for a 32 bit adder circuit for operands A=(FFFF FFFF)$_{16}$ and B=(1)$_{16}$ is shown in FIG. 3(d). The completion signal (TERM) and the carry out bit (S$_{32}$) do not require little more than a single bit delay.

For clarity only a few carry signals are displayed (C$_0$, C$_1$, C$_{15}$ and C$_{31}$). From C$_2$-C$_{31}$ all carry signals follow nearly same timing. The addition thus merely takes 1.29 ns to complete for the worst case propagation condition in 32 bit adder.

It has been a theory that the delay could be reduced to that of single gate delay by tuning MOS parameters for parallel connections. However, it was not possible with earlier adder designs to achieve constant time carry propagation which involves complex circuitry.

I claim:

1. A parallel self-timed digital adder, without look-ahead, the adder being an electronic processor having the structure of a digital logic circuit for performing arithmetic operations, the adder comprising:

two or more single bit adders, each single bit adder being a half-adder; and two multiplexers connected with each of the two or more half-adders, thereby forming two or more adder blocks, the multiplexers being operable to selectively provide inputs to the half-adders with which they are connected;

wherein the adder as an initial condition generates the result of a single bit summation as the first operation, whereafter in subsequent operations the sum bit from each adder block is connected recursively with itself through one of the multiplexers for addition with the carry in from the previous adder block and wherein the multiplexers enable the timing of inputs provided to the half adders for said subsequent operations at each adder block to be tuned to avoid delays in carry propagation from the previous adder block;

and further wherein each adder block transfers any carry generated thereby modifying its own recursive carry to zero, and the arithmetic operations terminate when the carry signals from all of the two or more adder blocks are zero, signaling completion of the arithmetic operations.

2. The adder in accordance with claim 1, wherein the initial condition for the arithmetic operations can be defined as $$S_i^0 = a_i \oplus b_i$$

$$C_i^0 = a_i b_i$$

where $S_i^j$ and $C_i^j$ are the Sum and Carry respectively for $i^{th}$ bit at the $j^{th}$ recursion.

3. The adder in accordance with claim 1, wherein the initial condition for the arithmetic operations can be defined as $$S_i^0 = a_i \oplus b_i$$

$$C_i^0 = a_i b_i$$

where $S_i^j$ and $C_i^j$ are the Sum and Carry respectively for $i^{th}$ bit at the $j^{th}$ recursion and wherein the $j^{th}$ iteration for the recursive addition can be found as $$S_i^j = S_i^{j-1} \oplus C_{i-1}^{j-1}$$

$$C_i^j = S_i^{j-1} C_{i-1}^{j-1}.$$

4. The adder in accordance with claim 1, wherein the digital logic circuit is implemented into CMOS (Complementary Metal-Oxide-Semiconductor) design.

5. The adder in accordance with claim 1, wherein the connection between the multiplexers and half-adders is parallel for the number of bits that do not require carry propagation.

* * * * *